May 19, 1942.   F. G. CARNAHAN   2,283,183
METHOD OF PRODUCING SELF SEALING TUBES
Filed Jan. 26, 1940

Inventor
Frank G. Carnahan

By
Attorney

Patented May 19, 1942

2,283,183

UNITED STATES PATENT OFFICE 2,283,183

METHOD OF PRODUCING SELF-SEALING TUBES

Frank G. Carnahan, Akron, Ohio

Application January 26, 1940, Serial No. 315,731

1 Claim. (Cl. 154—15)

This invention relates to puncture proof tire tubes and the art of manufacturing the same, and has as one of its principal objects to provide a support or re-enforcing shield for a tire tube which strengthens and protects the tube and is adapted to be applied to a conventional inner tube after vulcanization of said conventional inner tube.

Another object is to eliminate the necessity for dealers in puncture proof tubes stocking such tubes.

A further object is to provide a puncture proof tube at a substantially lower cost than has been possible heretofore.

Still another object is to provide a re-enforcement for the tread area of regular tire inner tubes and thereby eliminate flat tires from tube failures that occur due to localized thin spots which is an inherent fault of tubes laid in hot tube molds.

Yet another object is to provide a plastic type puncture proof tube with means for retaining the plastic filler in position.

Several types of puncture proof tubes have been proposed, one type employing a plastic sealing composition which is adapted to automatically flow into and seal punctures as they are formed, but difficulties have been experienced with that type for several reasons. For instance, since the tube can be only partially inflated before it is laid in the hot vulcanizing mold the heavy tread portion stubbornly resists expansion so that when the tube has been laid the mold closed and the internal molding pressure turned into the tube the thin side walls of the tube take the necessary stretch to permit the tube to press against the mold and as the thin walls have become softened by contact with the hot walls of the mold those spots that have become softest become extremely thin and the tube often fails at these thin spots in service.

At present, it is the common practice to manufacture a puncture proof tube complete and in one operation vulcanize it into one homogenous whole which makes it necessary for a retail dealer in such tubes to carry in his stock all the sizes he proposes to sell. Such stocking is expensive and often results in substantial losses due to deterioration of the tubes and to sizes becoming slow moving or obsolete.

Because of the necessity of carrying a large stock of puncture proof tubes it is necessary, in order for the dealer to make a profit, to add to the cost of the tubes the losses suffered from stocking and since this expense is considerable the cost of the tube to the consumer is substantially increased.

The plastic in the plastic type puncture proof tube heretofore commonly used is thrown, by the centrifugal force in service, from its original position and accumulates at the top of the tread of the tube and this leaves parts of the tube unprotected.

To overcome these and other objections, it is proposed, according to the present invention, to manufacture a shield adapted to be applied on and attached to a vulcanized regular tire inner tube where it will function as a shield against punctures, seal ruptures so as to prevent loss of air from the tube, and brace, and re-enforce the tube in the tread area of the tube.

The foregoing and other objects, features, and advantages of the invention will be clear from the following description in connection with the accompanying drawing and wherein.

Figure 4:
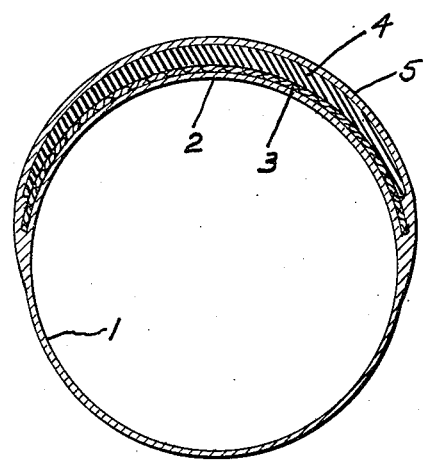
Figure 4 is a vertical transverse sectional view of an inner tube with the shield of Figure 3 in position and attached thereto.
Figure 5:
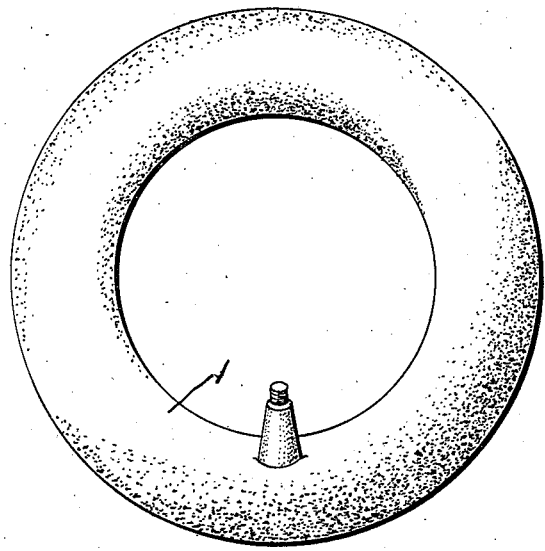
Figure 5 is a perspective view of the finished tube.

Referring first to Figures 5 and 4, it will be seen that the improved tube comprises an endless, annular, hollow body 1 of vulcanized rubber having a thickened tread wall 2 formed with an inner layer of rubberized fabric 3 which lies adjacent to the tread of a conventional inner tube to which the shield has been applied; a central layer of unvulcanized plastic sealing composition 4 centered over the fabric strip 3 and narrower than the strip 3, and an outer tread cover portion 5 of vulcanized rubber covering the tread portion of the tube and extending to a relatively short distance below the edges of the fabric strip 3. This fabric strip 3 may be rubberized in any manner found satisfactory but preferably it should be frictional both sides and skim coated on one side, being applied to the tube skim coat down to present a good adhesive surface to the tube whereas the friction side being up and in contact with the plastic sealing composition during the molding of the shield the plastic composition will be forced into the interstices of the fabric and thereby be firmly anchored on the surface of the fabric. It is to be understood that while I prefer fabric as fabric is generally understood by those engaged in the manufacture of rubber tires such as cord, or square woven fabric yet any relatively thin material of an open construction may be used and it is to be understood that the principle purpose of the strip 3 is to form a two way support in the improved tube as follows: First, the fabric being substantially inextensible and being attached to the tread portion of the conventional inner tube it will brace such tread portion against transverse stretching and force the transverse stretch of the tube which may occur when the tube is inflated in the tire for service to be taken up by that portion of the tube below the strip 3. This is important because the tread area of the conventional molded inner tubes is often extremely thin. In some cases a slight circumferential stretch of the tread of the tube is necessary for the tube tread to reach the outer portion of the inside of the tire and I use the fabric in the strip 3 on a slight bias for that purpose or select a weave that will permit sufficient stretch for that purpose. Second, the strip 3 anchors the plastic sealing composition by the plastic material having been forced by the molding pressure into the openings in the fabric as described hereinabove and the fabric strip being anchored to the vulcanized tread rubber of the previously molded tube 1 it is evident that the fabric strip 3 is firmly held against shifting in service. It will be seen that the relatively inextensible fabric strip 3 will prevent the portion of the improved tube lying over it from stretching in the same way as it braces the tread portion of the previously molded tube. This is important as it is obvious that a rupture through a stretched piece of rubber even though it be of a plastic type that such rupture will permit air to leak through.

I have discovered that the placing of the fabric strip approximately next to the tread of the previously molded tube is necessary to accomplish the results set out hereinabove and to prevent failure of the tube in service. When an inner tube is put into service the rubber compound, regardless of the degree of vulcanization, will lose its nerve or come-back and will flow from localized pressure in such a manner as does the ice of a glacier move away from the pressure area. By placing the strip 3 under the plastic sealing material 4 and the central part of strip 5 I do not place those parts of the tube under any localized compression consequently when the tube is inflated in service and the severe flexing of service is occurring the sidewalls of the tube have taken the necessary stretch to permit the tube to rest against the inside of the tire and tire rim or flap and there is no severe line of stress at the edge of the strip 3 consequently, there is no tendency for the edges of strip 3 to rupture the tube along said edge.

As a puncturing object is withdrawn from the tube, the sealing composition will flow or be drawn into the hole formed in the vulcanized rubber, and by virtue of its plasticity and viscous nature, will seal the puncture and prevent the escape of air from within the tube. In like manner, any hole about a puncturing object that was not withdrawn would be sealed.

A method of manufacturing the tube shield and the tube comprising this invention is as follows:

A common type all rubber air bag 6 is used as a building core and as an expanding molding core. Around the tread of the bag 6 is laid the strip 3 making the usual lap end splice, not shown. Next a layer of plastic sealing composition 4 which is run to a predetermined contour and being narrower than the strip 3 and preferably with relatively thin edges and approximately $\frac{3}{16}$" thick at the center. At each edge of the layer 4 is butted a strip of vulcanizable rubber 7 which extends approximately ½" below the edges of the fabric strip 3. Over the layer 4 is laid layer 5 which extends down the sides for enough to contact the strips 7. All the strips and layers are unvulcanized and extend around the bag 6 in similar manner as strip 3. It will be obvious to those skilled in the art that strips 3, 4, 5 and 7 or any combination of them may be assembled and applied to the building core 6 as a unit. The bag 6 with the built-up unvulcanized shield is now ready to be placed in the mold 8. The mold 8 may be spun aluminum or any other suitable metal or may be a two piece mold the only requisite being that it is a practical mold and has an inside contour suitable to mold an annular, one piece shield shaped to apply to a conventional tire inner tube and to be attached thereto. After the air bag with the built-up shield has been placed in the mold 8 the air bag is inflated by air through the ordinary valve 9. The shield is then vulcanized by placing the mold in an open steam cure in a common horizontal vulcanizer, not shown. If found economical a steam jacket mold of a watch case type may be used or other type molds familiar to those experienced in the art.

Also super heated water or steam or any gas or fluid may be used for internal pressure or mechanical means may be substituted for an expanding bag.

Figure 1:
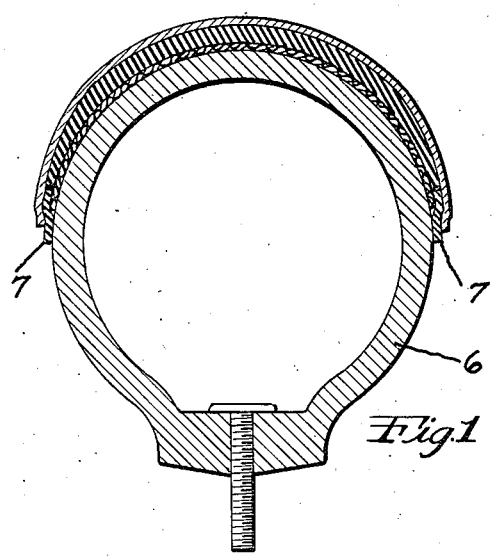
Figure 1 is a vertical transverse sectional view taken through the valve area of a building core on which a shield has been assembled ready for molding.
Figure 2:
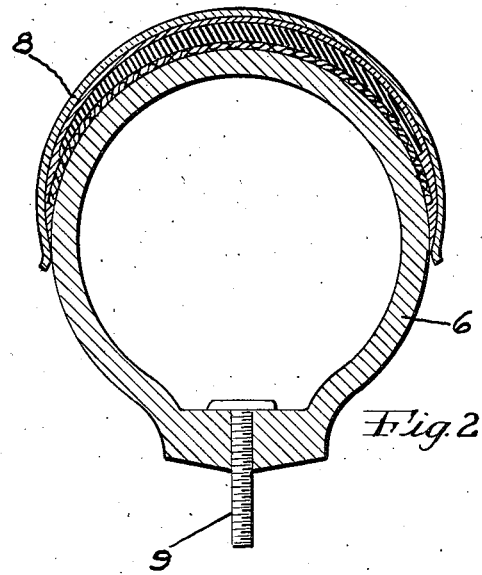
Figure 2 is the same as Figure 1 except the assembly of Figure 1 is shown in the mold during the process of vulcanization.
Figure 3:
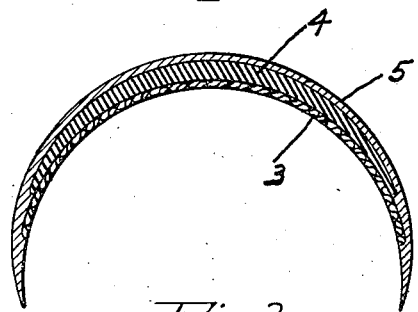
Figure 3 is a sectional view of the shield.

After vulcanization the shield is stripped from the bag and it will be found to have been molded to the shape best shown in Figure 3.

The shield is in form to be applied to a conventional inner tube and in practice said shield would be delivered to a retail tire dealer who when he desired to apply the shield to one of his regular stocked inner tubes would select the proper size shield for that tube and cement the inside of the shield and also the tread surface of the tube. After the cement has dried properly the shield is slipped over the tube tread into position as shown in Figure 4 and the assembly is ready to be mounted in a tire for service.

It will now be seen that I have produced a tube shield which retains the plastic sealing stock against misplacement from centrifugal force to which it is subjected in service. It is also evident that any air that may leak from the tube into the shield will be baffled from continuing beyond the shield.

Obviously the invention is susceptible to numerous modifications in the details of construction and in the steps of the method and the right is therefore reserved to make such changes as fall within the scope of the appended claim without departing from the spirit of the invention.

Having thus described my invention what I claim is:

Steps in the method of producing self-sealing tubes, which consists in superimposing centrally on the tread portion of an expansible curing bag a relatively inextensible rubberized fabric strip of sufficient width to overlie substantially the entire tread portion of an inner tube on which it is to be applied, next applying centrally over said rubberized fabric strip a strip of unvulcanizable plastic rubber whose width is less than the width of said rubberized fabric strip, next applying a cover strip of vulcanizable rubber centrally over the rubberized fabric and plastic rubber strips the said cover strip being of sufficient width to overlap the underneath strips and to contact the sides of said expansible curing bag, placing the assembly of bag and strips in a vulcanizing mold, inflating the curing bag whereby to obtain pressure on the said assembly during vulcanization, vulcanizing the assembled strips, removing the vulcanized strips from said curing bag in one composite tube shield form and permanently applying the said shield to the tread portion of a previously formed inner tube whereby to form a self-sealing inner tube.

FRANK G. CARNAHAN.